(12) United States Patent
Yaffe

(10) Patent No.: US 10,351,198 B2
(45) Date of Patent: Jul. 16, 2019

(54) MOTORCYCLE COMPONENT ADJUSTMENT MEMBER AND ASSEMBLY AND METHOD OF ADJUSTING A MOTORCYCLE COMPONENT

(71) Applicant: Paul Yaffe, Phoenix, AZ (US)

(72) Inventor: Paul Yaffe, Phoenix, AZ (US)

( * ) Notice: Subject to any disclaimer, the term of this patent is extended or adjusted under 35 U.S.C. 154(b) by 0 days.

(21) Appl. No.: 15/997,289

(22) Filed: Jun. 4, 2018

(65) Prior Publication Data

US 2018/0273128 A1    Sep. 27, 2018

Related U.S. Application Data

(63) Continuation-in-part of application No. 15/483,677, filed on Apr. 10, 2017, which is a continuation-in-part of application No. 14/796,391, filed on Jul. 10, 2015, now Pat. No. 9,616,957.

(51) Int. Cl.
| | |
|---|---|
| *B62J 17/04* | (2006.01) |
| *B60Q 1/04* | (2006.01) |
| *B62J 6/02* | (2006.01) |
| *B62K 19/48* | (2006.01) |
| *B62J 17/02* | (2006.01) |
| *B60Q 1/068* | (2006.01) |

(52) U.S. Cl.
CPC .............. *B62J 17/04* (2013.01); *B60Q 1/045* (2013.01); *B60Q 1/0483* (2013.01); *B62J 6/02* (2013.01); *B62J 17/02* (2013.01); *B62K 19/48* (2013.01); *B60Q 1/068* (2013.01)

(58) Field of Classification Search
CPC ........ B60J 17/04; B60Q 1/045; B60Q 1/0483; B62K 19/48
USPC .......................................................... 296/78.1
See application file for complete search history.

(56) References Cited

U.S. PATENT DOCUMENTS

| | | | | |
|---|---|---|---|---|
| 4,686,656 A | * | 8/1987 | Morishima | .......... B60Q 1/0035 296/78.1 |
| 6,820,756 B2 | * | 11/2004 | Garza | ..................... B62J 17/04 211/87.01 |
| 7,357,439 B1 | * | 4/2008 | Morin | ..................... B62J 17/04 296/78.1 |
| 7,552,959 B2 | * | 6/2009 | Salisbury | ................ B62J 17/02 296/78.1 |

* cited by examiner

*Primary Examiner* — Joseph D. Pape
(74) *Attorney, Agent, or Firm* — Ice Miller LLP

(57) ABSTRACT

A motorcycle component adjustment member having an second side configured for mounting against a headlight of a motorcycle and an first side configured for mounting against a fairing member outer surface of a fairing member of a motorcycle. An adjustment angle is formed by the second side and the first side. The adjustment angle adjusts an angle of the headlight relative to the fairing member of the motorcycle.

17 Claims, 18 Drawing Sheets

MOTORCYCLE COMPONENT ADJUSTMENT MEMBER AND ASSEMBLY AND METHOD OF ADJUSTING A MOTORCYCLE COMPONENT

RELATED APPLICATION DATA

This application is a continuation-in-part of and claims the benefit to U.S. patent application Ser. No. 14/796,391, filed Jul. 10, 2015, now U.S. Pat. No. 9,616,957, and U.S. patent application Ser. No. 15/483,677, filed Apr. 10, 2017, which are hereby incorporated by reference in their entireties.

BACKGROUND

Some motorcycles include a front fairing assembly located near a top portion of the front fork assembly. The front fairing assembly may include one or more headlamps, turn signals, gauges, or other instrumentation, or one or more mirrors, or a combination thereof. A front fairing assembly, including the motorcycle headlight or another component of the motorcycle, may have an undesirable vertical position relative to the rider, the motorcycle frame, or any other motorcycle component. Such positioning of a component of the front fairing assembly may adversely affect the angle or position of the headlight or other component, thereby adversely affecting the safety, utility, and/or aesthetic appearance of the motorcycle.

Therefore, there exists a need for a motorcycle component adjustment member, a motorcycle component adjustment assembly, and a method of adjusting a motorcycle component that conveniently and reversibly improves the function, safety, and aesthetic appearance of the motorcycle.

SUMMARY

In accordance with an example of the present disclosure, a motorcycle component adjustment assembly is provided. The assembly includes a front fork assembly disposed at a forward location of a motorcycle frame. The assembly further includes a fairing member. The assembly also includes a component capable of coupling to the fairing member. The assembly also includes a component adjustment member capable of coupling to the fairing member between the component and the fairing member. The component adjustment member includes a first side and a second side forming an adjustment angle that adjusts the angle of the component relative to the fairing member.

In accordance with another example of the present disclosure, a method of adjusting a motorcycle component is disclosed. The method includes providing a front fork assembly disposed at a forward location of a motorcycle frame. The method further includes providing a fairing member to be coupled to the front fork assembly. The method also includes providing a component. The method further includes providing a component adjustment member comprising a first side and a second side forming an adjustment angle. The method also includes coupling the first side of the component adjustment member to the fairing member. The method further includes coupling the component to the second side of the component adjustment member, where the adjustment angle adjusts the angle of the component relative to the fairing member.

In accordance with another example of the present disclosure, a component adjustment member is disclosed. The component adjust member includes a first side and a second side disposed such that an adjustment angle is formed therebetween. The component adjust member also includes an aperture defining an inner perimeter having an at least one contour and an outer perimeter. Where the outer perimeter is generally circular in shape. Where the adjustment angle ranges from approximately 3 degrees to approximately 15 degrees. Where the first side is capable of being coupled to motorcycle fairing member and the second side is capable of being coupled to a motorcycle headlight such that the angle of the headlight relative to the fairing member is adjusted by the adjustment angle. Where the at least one contour is sized and shaped such that it is capable of receiving the headlight.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
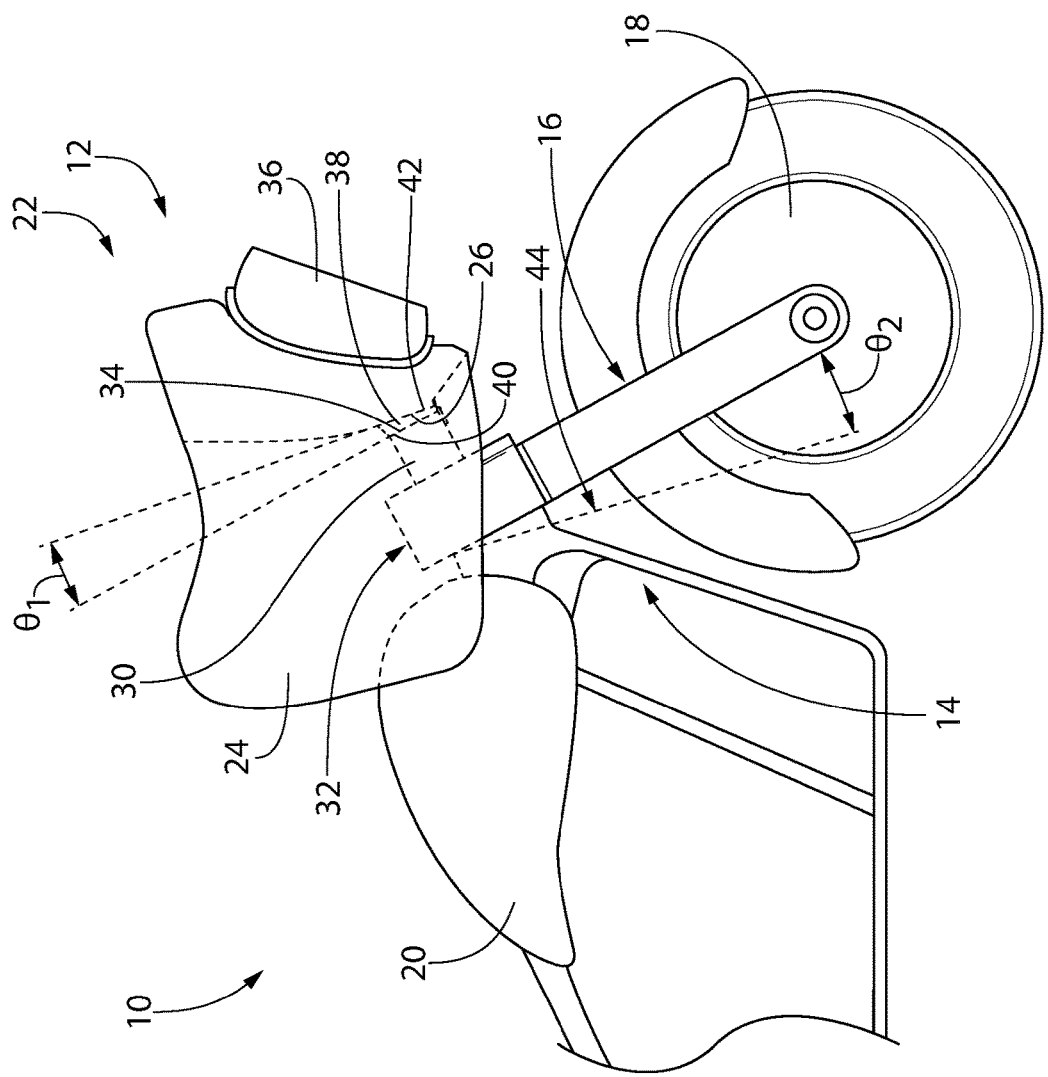
FIG. 1 is a side elevation view of a front portion of a motorcycle having a fairing adjustment assembly in accordance with aspects of the present disclosure.
Figure 2:
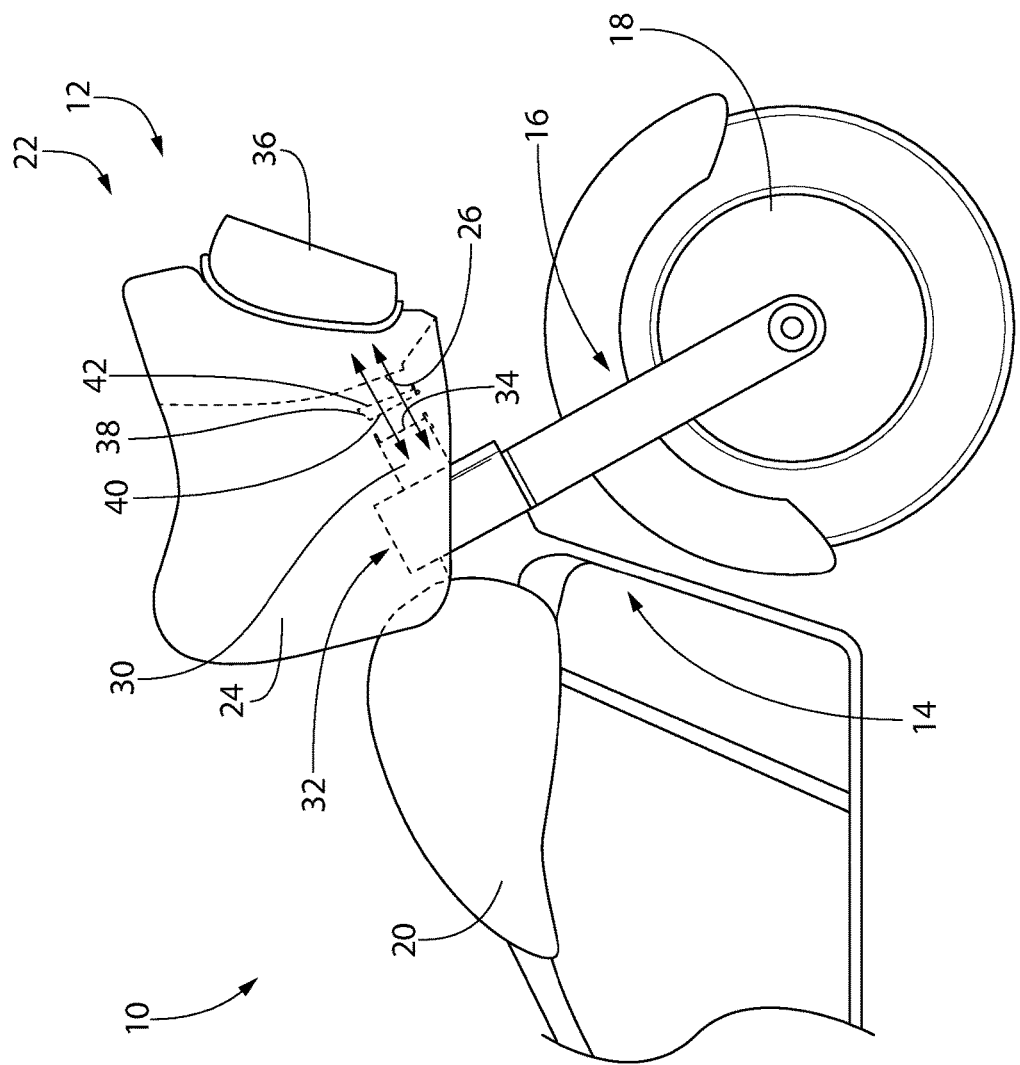
FIG. 2 is a partially exploded side elevation view of a motorcycle having a fairing adjustment assembly in accordance with aspects of the present disclosure.
Figure 3:
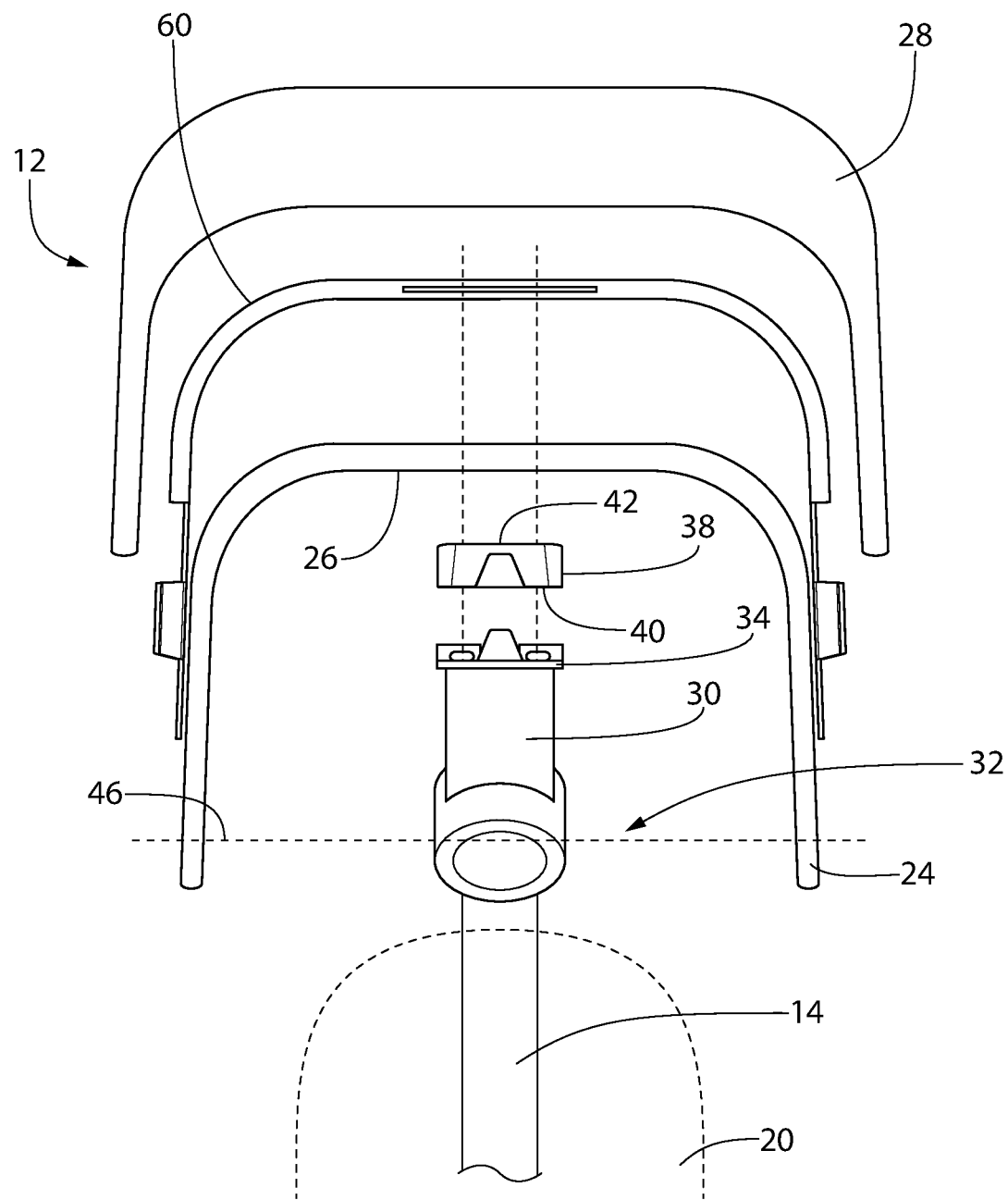
FIG. 3 is a top partially exploded view of a motorcycle having a fairing adjustment assembly in accordance with aspects of the present disclosure.

Referring now to FIGS. 1-3, a motorcycle fairing adjustment assembly 12 is shown. The front portion of a motorcycle 10 includes a frame 14, a fork assembly 16, a front wheel 18, a fuel tank 20, and a motorcycle fairing 22. The motorcycle fairing 22 includes an inner fairing member 24 with an inner fairing member inner surface 26 in the embodiment shown. The motorcycle fairing 22 of an embodiment further includes an outer fairing member 28, as illustrated in FIG. 3. Although the present disclosure describes an inner fairing member 24 and an outer fairing member 28, the existence of an inner fairing member does not require the existence of an outer fairing member and the existence of an outer fairing member does not require the existence of an inner fairing member. A fairing bracket 30 is located at or adjacent to a neck portion 32 of the frame 14 in an embodiment. The fairing bracket 30 includes a fairing bracket outer surface 34. The fairing adjustment assembly 12 of an embodiment includes one or more headlamps 36. In one or more embodiments, the fairing adjustment assembly 12 includes one or more gauges or other instrumentation (not shown), one or more turn signals (not shown), one or more mirrors (not shown), headlight(s) (not shown), and/or a windscreen (not shown). The fairing bracket 30 extends longitudinally forward from the neck portion 32 of the motorcycle frame 14 as shown in FIGS. 1-3. The inner fairing member 24 at least partially wraps around the fairing bracket 30 in the embodiment illustrated in FIG. 3. In another embodiment, the inner fairing member 24 extends longitudinally rearward to partially enclose and/or partially obscure the fairing bracket 30 and/or the neck portion 32 of the frame 14. In another embodiment, the inner fairing 24 is disposed adjacent to the fairing bracket 30 and/or the neck portion 32. The fairing adjustment assembly 12 further includes a fairing adjustment member 38 disposed between the fairing bracket 30 and the inner fairing member 24. The fairing adjustment member 38 of an embodiment is generally wedge-shaped. The fairing adjustment member 38 includes an inner side 40 and an outer side 42 forming an adjustment angle θ1. The adjustment angle θ1 adjusts an angle and/or position of the inner fairing member 24 relative to the motorcycle frame 14, neck portion 32, or fairing bracket 30. In one or more additional embodiments, the adjustment angle θ1 adjusts an angle and/or position of one or more of the outer fairing member 28, gauges or other instrumentation (not shown), one or more turn signals (not shown), one or more mirrors (not shown), headlight(s) (not shown), and/or a windscreen (not shown).

In an embodiment, a rake angle of the neck portion 32 is adjusted or modified to form a rake adjustment angle θ2 of the neck portion 32, as indicated in FIG. 1. The rake adjustment angle θ2 of the neck portion 32 refers to the difference between an adjusted or modified rake angle of the motorcycle frame 14 and the original rake angle of the motorcycle frame 14 before adjustment or modification. The rake adjustment angle θ2 of an embodiment corresponds with the adjustment angle θ1 of the fairing adjustment member 38. In an embodiment, a method of the present disclosure includes removing the neck portion 32 from the motorcycle frame 14. Such removal may include, without limitation, cutting the neck portion 32 off of the motorcycle frame 14. An unadjusted neck portion position 44 is illustrated in FIGS. 1 and 2 and refers to the position or angle of the neck portion 32 prior to adjustment or modification.

Referring again to FIG. 3, a fairing support member 60 forms part of the motorcycle 10 in an embodiment, as described in the U.S. patent application Ser. No. 14/796,314, now U.S. Pat. No. 9,561,831, filed on Jul. 10, 2015 and entitled "Motorcycle Fairing Support Member and Assembly and Method of Supporting a Motorcycle Fairing" by inventor Paul Yaffe, which is hereby incorporated by reference in its entirety.

The method of an embodiment further includes coupling an adjusted neck portion 32 to the motorcycle frame 14. Such coupling of the adjusted neck portion 32 may include welding, fastening, adhering, or otherwise attaching the same neck portion 32 or a different or additional neck portion 32 to the motorcycle frame 14. The adjusted, different, or additional neck portion 32 includes the rake adjustment angle θ2 corresponding with the adjustment angle θ1 of the fairing adjustment member 38. In an embodiment, adjusting the rake angle of the neck portion 32 to form the rake adjustment angle θ2 comprises rotating the neck portion 32 about a lateral axis 46, as indicated in FIG. 3. The term "corresponding," as recited in the present disclosure, refers to being equal or substantially equal in one embodiment of the present disclosure and having the same angle within five degrees in either direction in another embodiment of the present disclosure.

In accordance with one or more embodiments of the present disclosure, the method further includes coupling the fairing adjustment member 38 to the fairing bracket 30 at the fairing bracket outer surface 34. The method of an embodiment further includes coupling the inner fairing member 24 to the fairing adjustment member 38 at the inner fairing member inner surface 26 such that an angle between the inner fairing member inner surface 26 and the fairing bracket outer surface 34 corresponds to the adjustment angle θ1 of the fairing adjustment member 38, as illustrated in FIGS. 1 and 2. The outer side 42 of the fairing adjustment member 38 is disposed against the inner fairing member inner surface 26, and the inner side 40 of the fairing adjustment member 38 is disposed against the fairing bracket outer surface 34 in an embodiment.

As shown in FIG. 3, an embodiment of the present disclosure includes a fairing support member 60 positioned adjacent the inner fairing member 24. The fairing support member 60 of an embodiment forms part of a fairing adjustment assembly 12 and includes a contour that substantially corresponds to one or more contours, dimensions, surfaces, or features of the inner fairing member 24 and/or the outer fairing member 28, as illustrated in FIG. 3.

Figure 4:
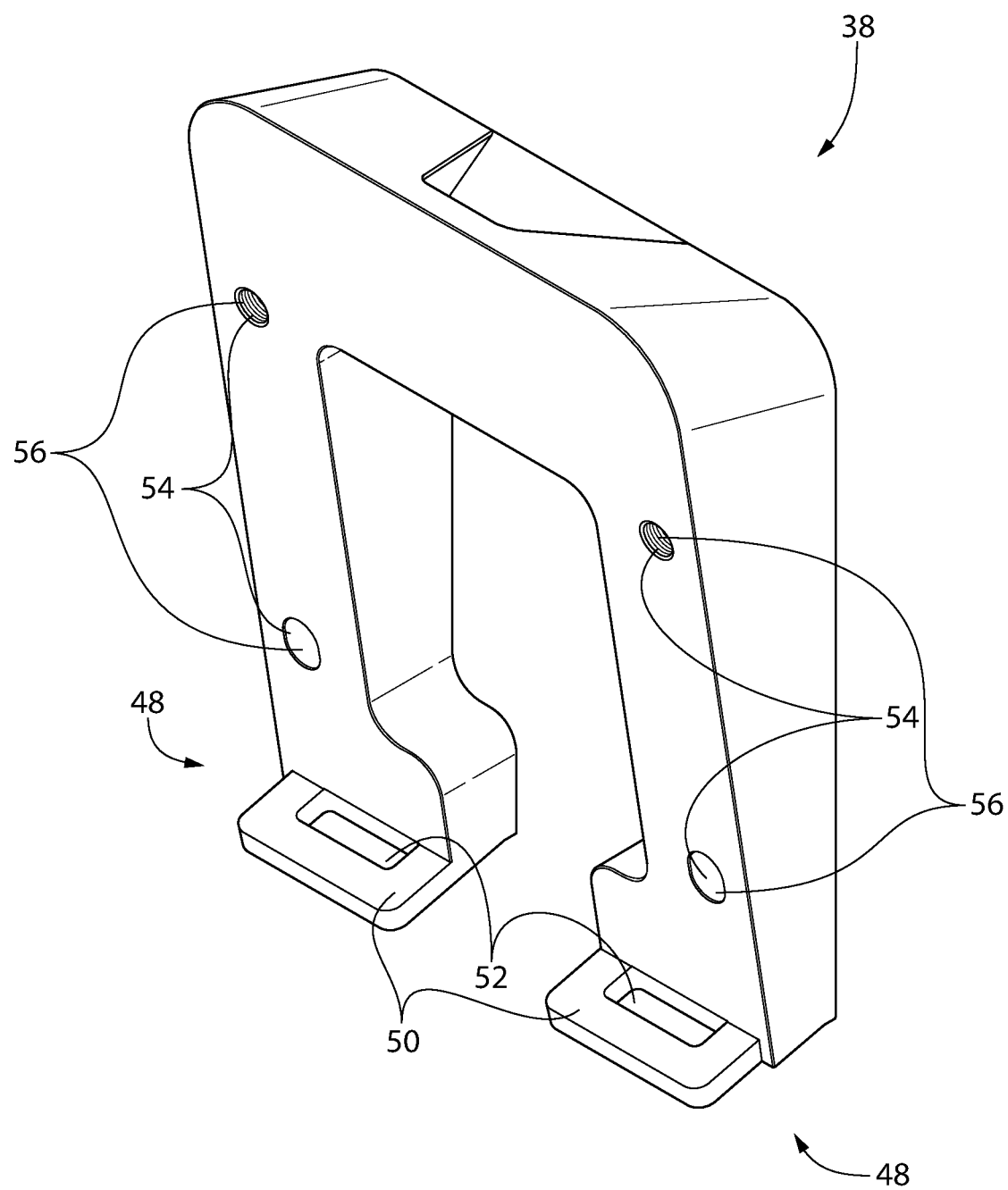
FIG. 4 is a perspective view of a fairing support member in accordance with aspects of the present disclosure.
Figure 5:
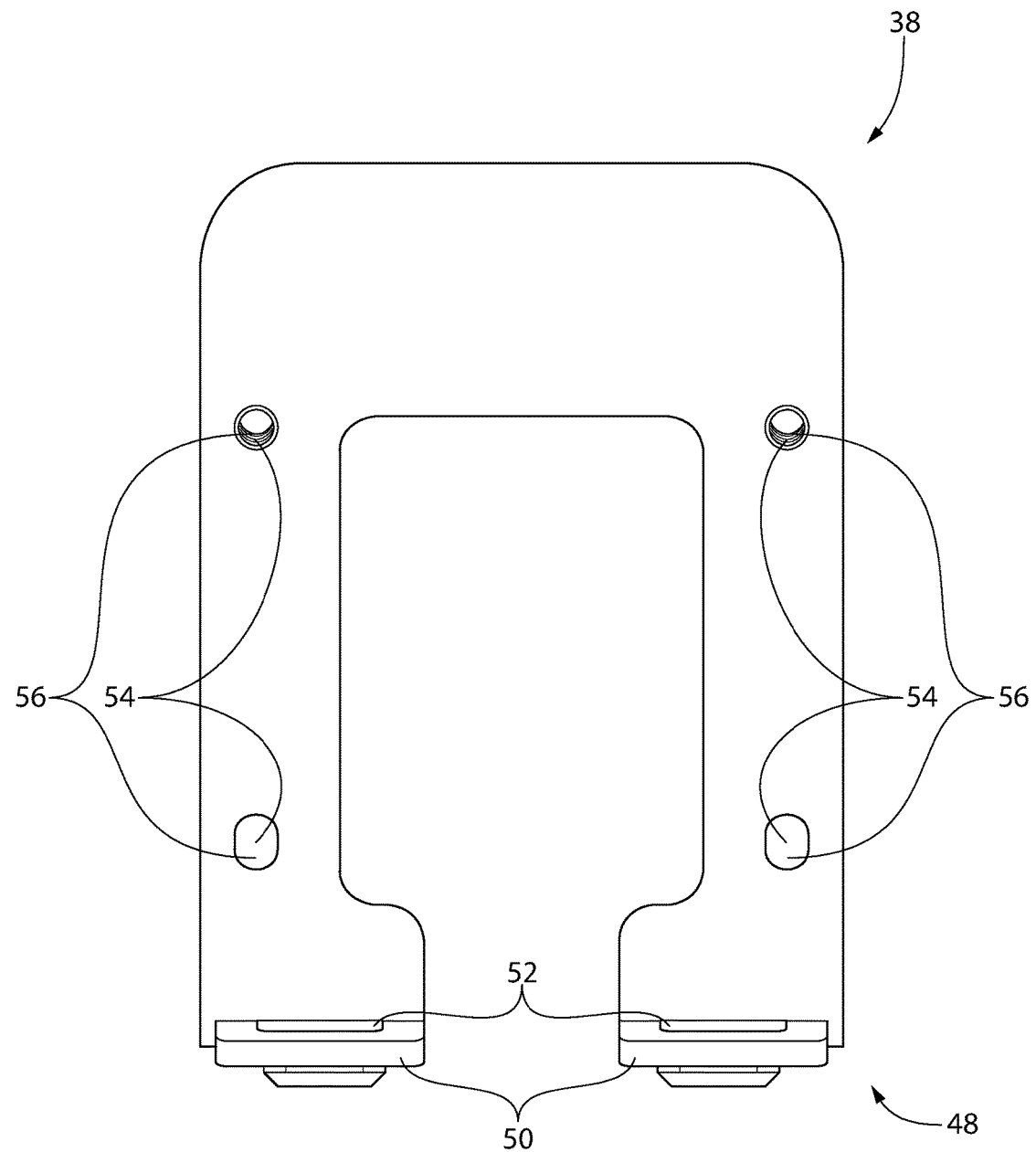
FIG. 5 is a front elevation view of a fairing support member in accordance with aspects of the present disclosure.
Figure 6:
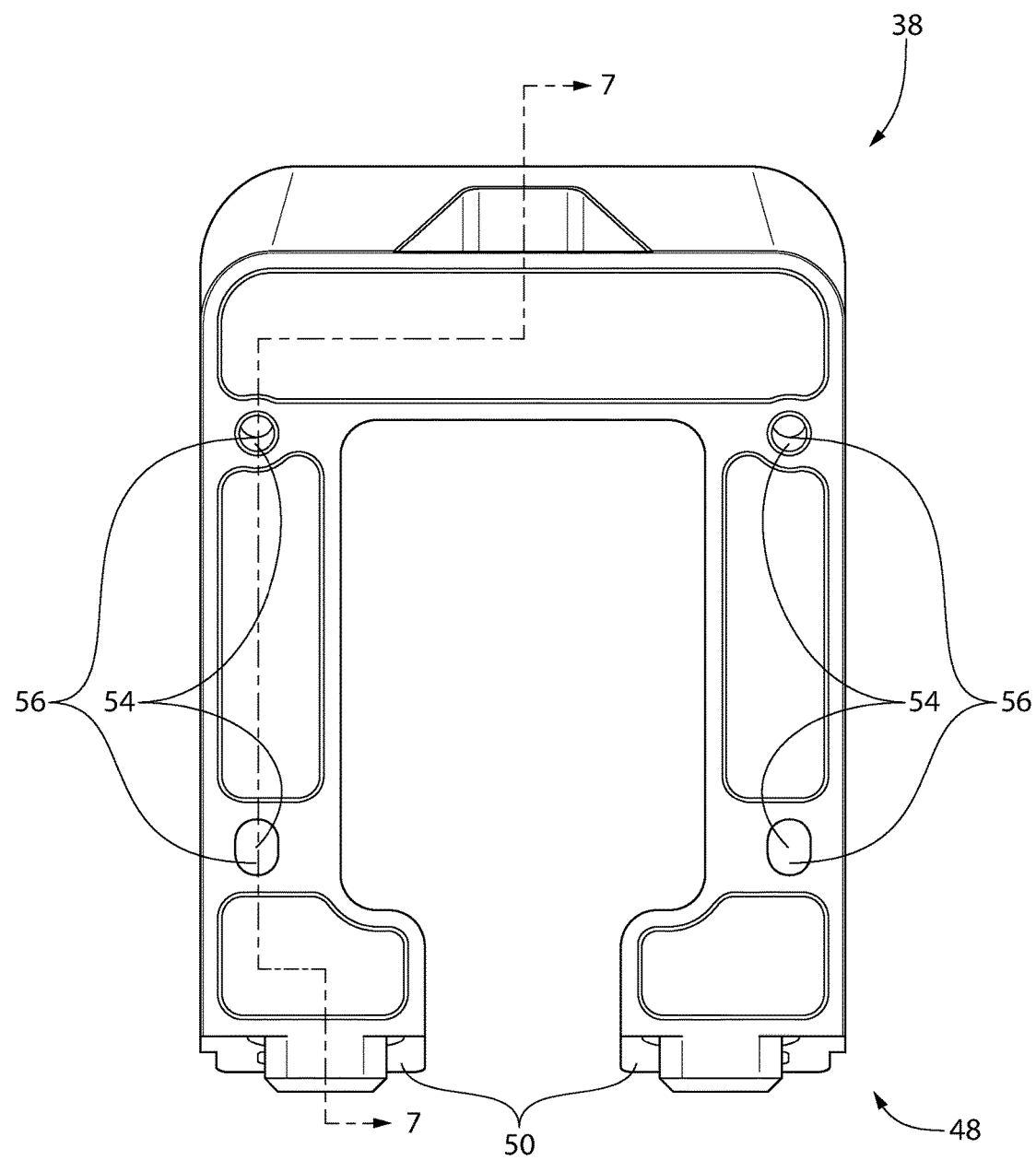
FIG. 6 is a rear elevation view of a fairing adjustment member in accordance with aspects of the present disclosure.
Figure 7:
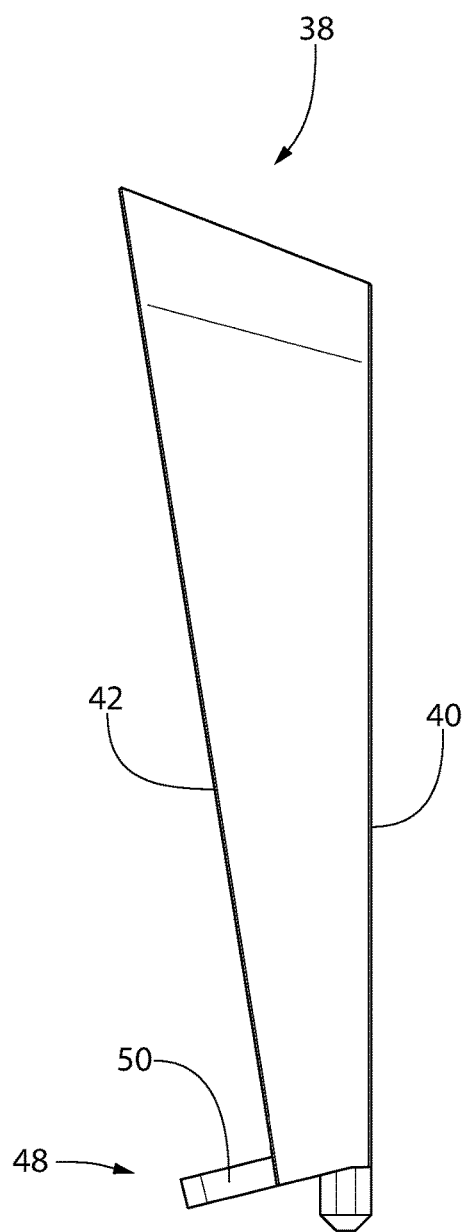
FIG. 7 is a side elevation view of a fairing adjustment member in accordance with aspects of the present disclosure.
Figure 10:
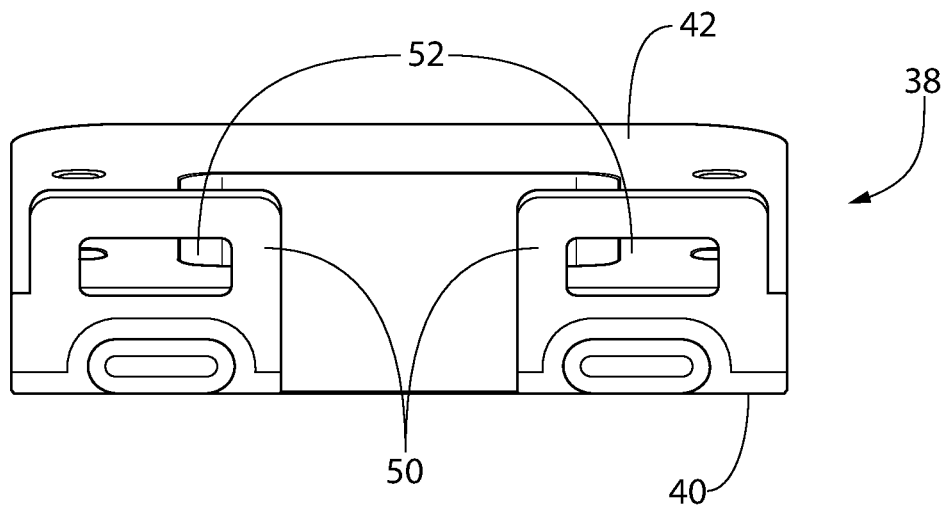
FIG. 10 is a bottom plan view of a fairing adjustment member in accordance with aspects of the present disclosure.

Referring now to FIGS. 4-10, the fairing adjustment member 38 of one or more embodiments is illustrated in detail. The fairing adjustment member 38 includes a lower support portion 48 providing vertical support for the inner fairing member 24. The lower support portion 48 includes a plurality of support members 50 extending longitudinally to provide vertical support for the inner fairing member 24. As illustrated in FIGS. 1 and 2, the support members 50 of the lower support portion 48 extend below the inner fairing member 24 of an embodiment. In an additional embodiment, the support members 50 include a plurality of depressions 52, as best shown in FIGS. 4 and 10, to enable positioning of the inner fairing member 24 relative to the fairing adjustment member 38. The plurality of depressions 52 includes one or more slots in an embodiment. The inner fairing member 24 of an embodiment includes protrusions (not shown) that fit into the depressions 52 for positioning and/or support.

Figure 8:
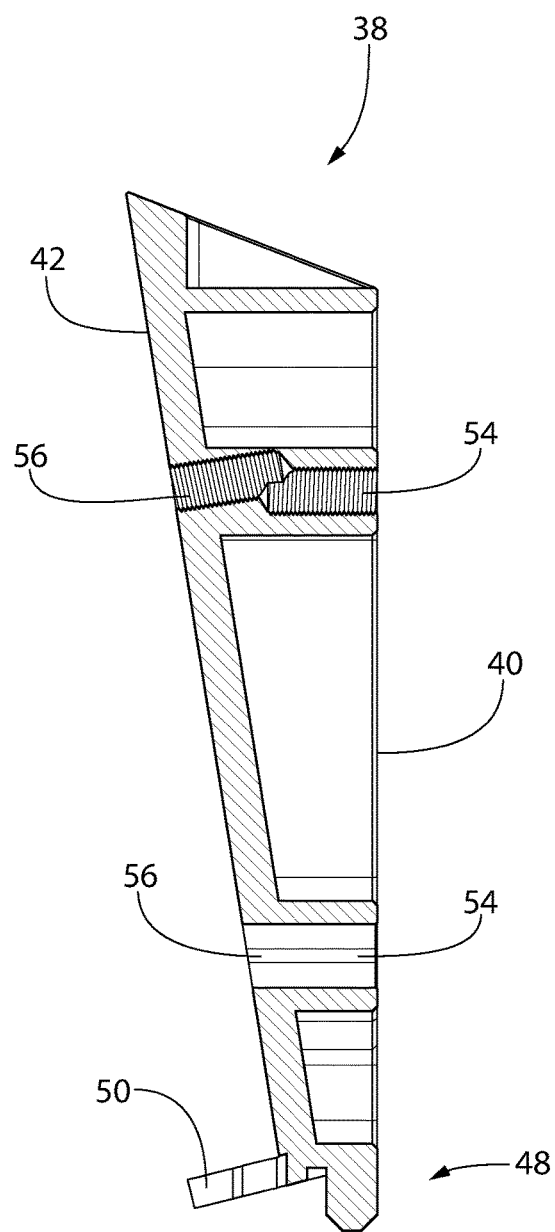
FIG. 8 is a cross-sectional view of the fairing adjustment member depicted in FIG. 6 in accordance with aspects of the present disclosure.
Figure 9:
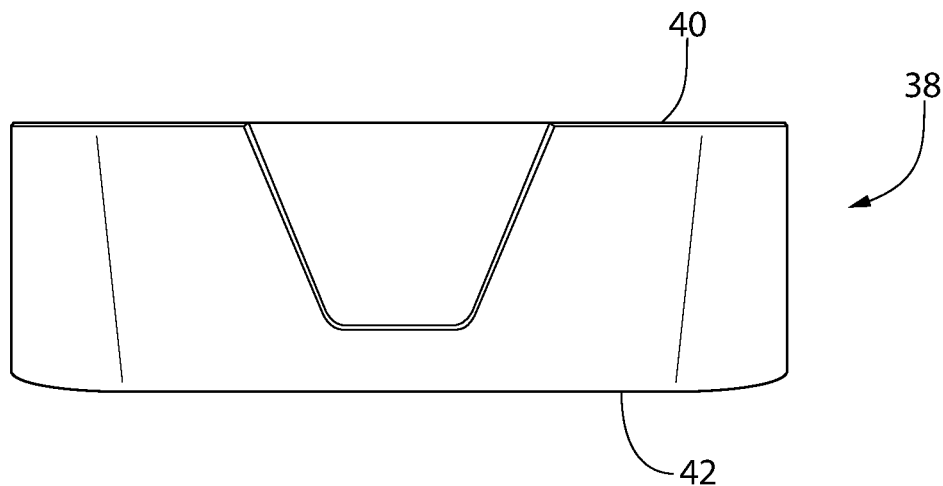
FIG. 9 is a top plan view of a fairing adjustment member in accordance with aspects of the present disclosure.

The fairing adjustment member 38 of an embodiment is coupled to the fairing bracket 30 with one or more fasteners (not shown) through one or more bracket fastener holes 54, as illustrated in FIG. 8. In one or more embodiments, the fairing adjustment member 38 is coupled to the fairing bracket 30 using other coupling means such as integral formation, welding, adhesives, or interference fitting. Additionally, the fairing adjustment member 38 of an embodiment is coupled to the inner fairing member 24 using one or more fasteners (not shown) through one or more fairing fastener holes 56, as illustrated in FIG. 8. In one or more embodiments, the fairing adjustment member 38 is coupled to the inner fairing member 24 using other coupling means such as integral formation, welding, adhesives, or interference fitting. One of ordinary skill will recognize various coupling and fastening means, and such methods and structures are included in the present disclosure with regard to any coupling operations or structures.

Figure 11:
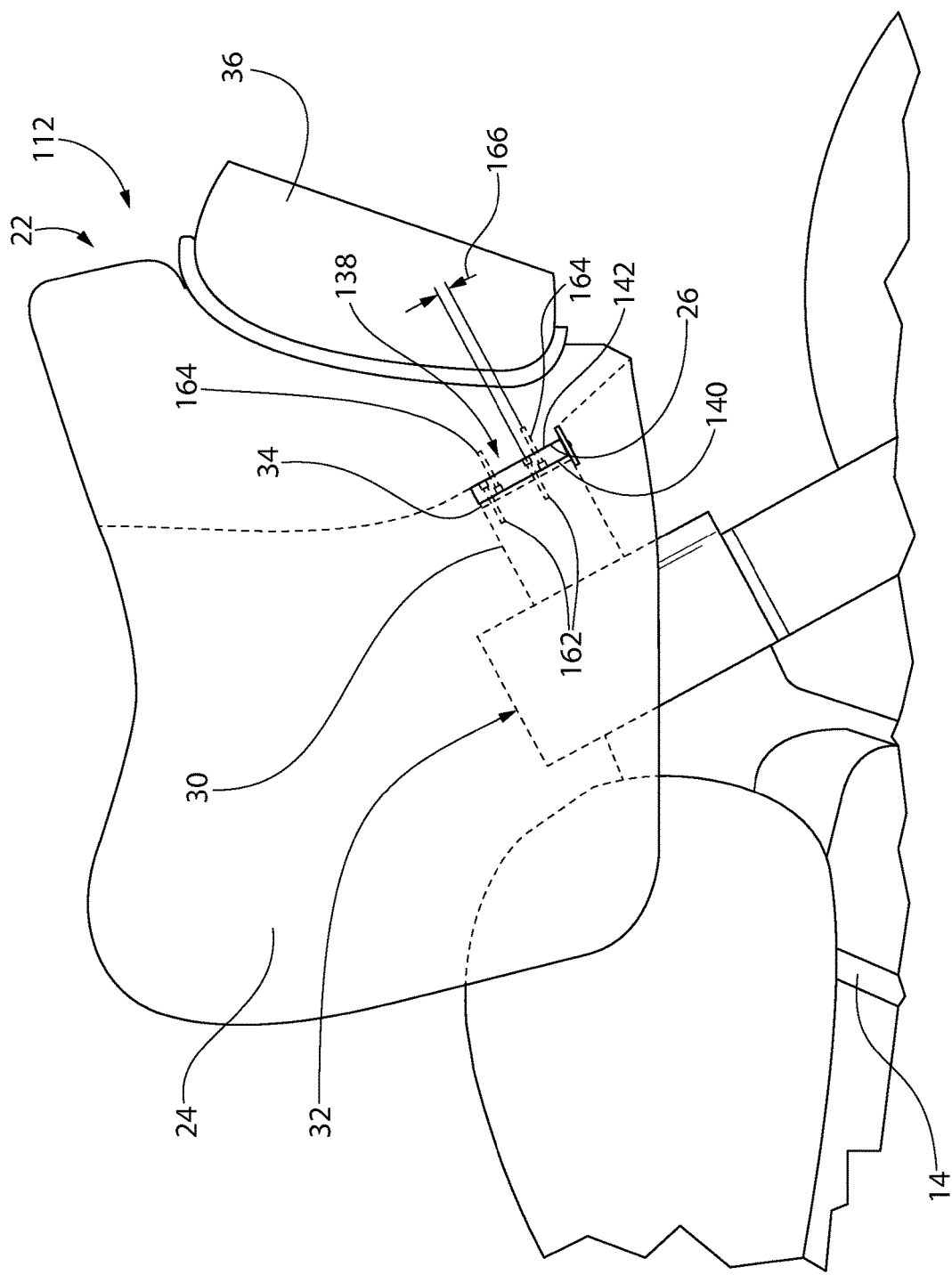
FIG. 11 is a side elevation view of a front portion of a motorcycle having a fairing adjustment assembly in accordance with aspects of the present disclosure.

Reference is now made to FIG. 11, which illustrates a motorcycle fairing adjustment assembly 112 in accordance with particular embodiments of the present disclosure. The assembly 112 includes the fairing bracket 30 extending longitudinally forward from the neck portion 32 of the motorcycle frame 14, the inner fairing member 24 disposed adjacent to the fairing bracket 30, and a fairing adjustment member 138 disposed between the fairing bracket 30 and the inner fairing member 24. The inner fairing member 24 is separated from the fairing bracket 30 by the fairing adjustment member 138 in the illustrated embodiment. By reference, the descriptions, features, and embodiments above and illustrated in FIGS. 1-3 form part of the embodiments illustrated in FIG. 11 and subsequent FIGS. 12-17 and descriptions. The motorcycle fairing 22 includes the inner fairing member 24 with the inner fairing member inner surface 26 in the embodiment shown. The motorcycle fairing 22 of an embodiment further includes the outer fairing member 28, as illustrated in FIG. 12.

Figure 12:
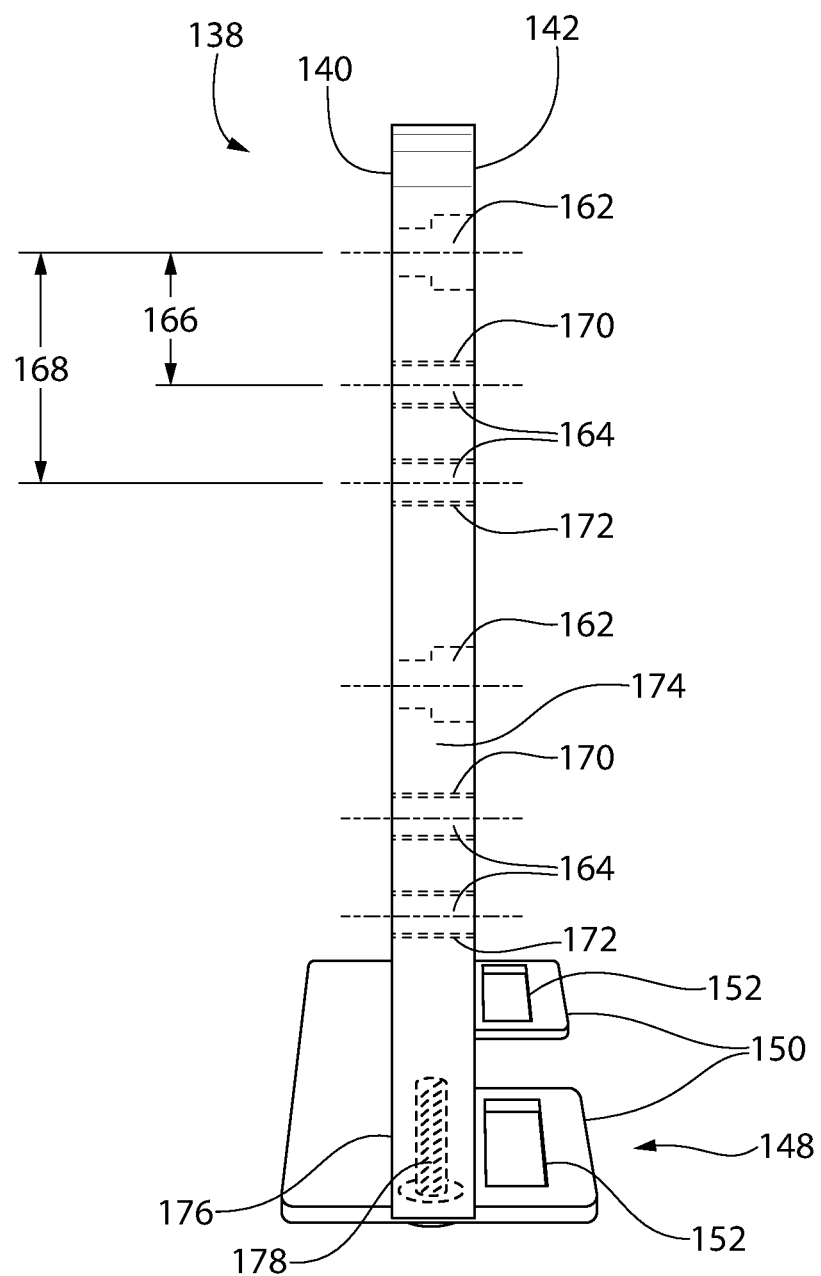
FIG. 12 is an elevation view of a fairing support member in accordance with aspects of the present disclosure.
Figure 13:
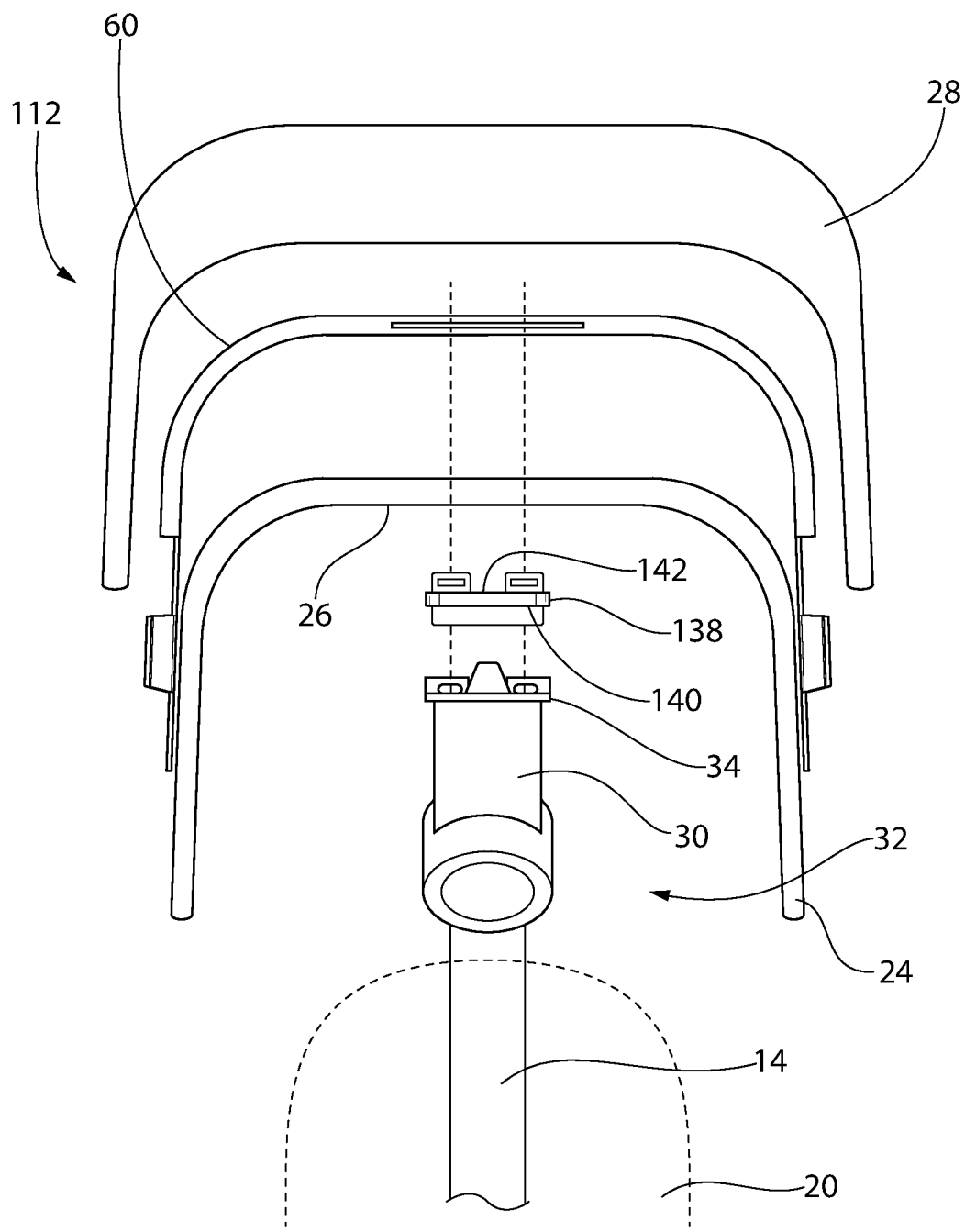
FIG. 13 is a top partially exploded view of a motorcycle having a fairing adjustment assembly in accordance with aspects of the present disclosure.
Figure 14:
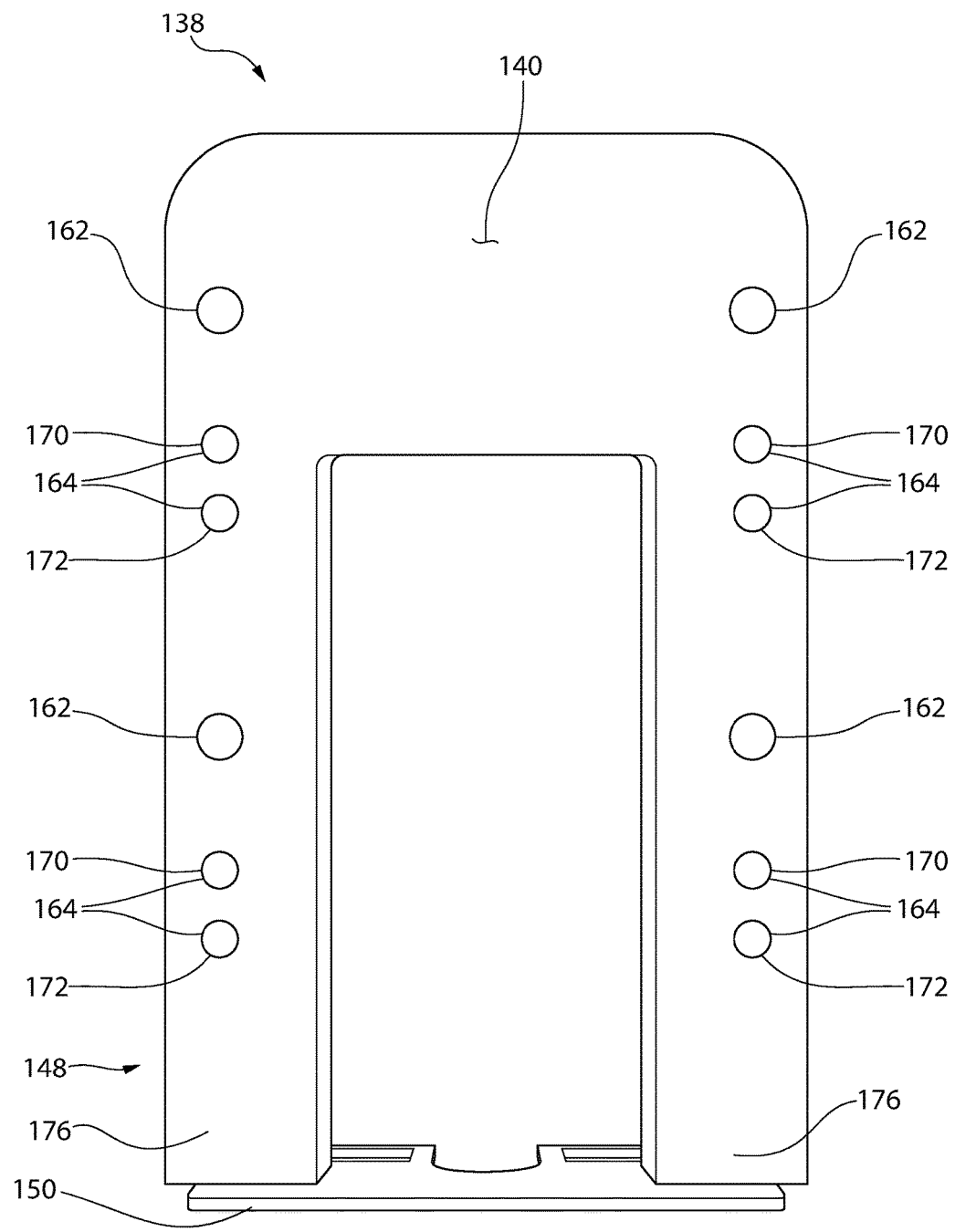
FIG. 14 is an elevation view of a fairing support member in accordance with aspects of the present disclosure.
Figure 15:
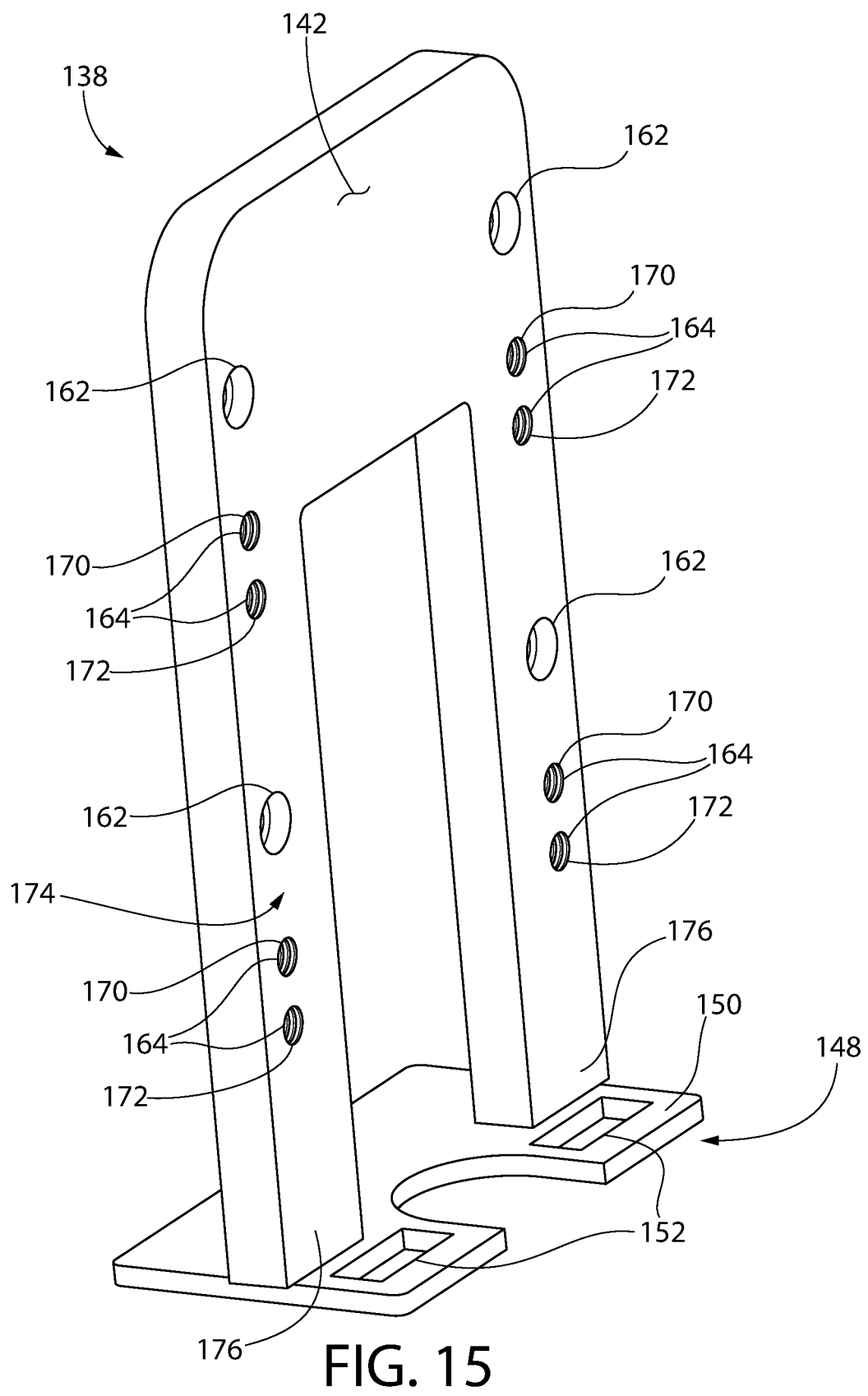
FIG. 15 is a perspective view of a fairing support member in accordance with aspects of the present disclosure.
Figure 16:
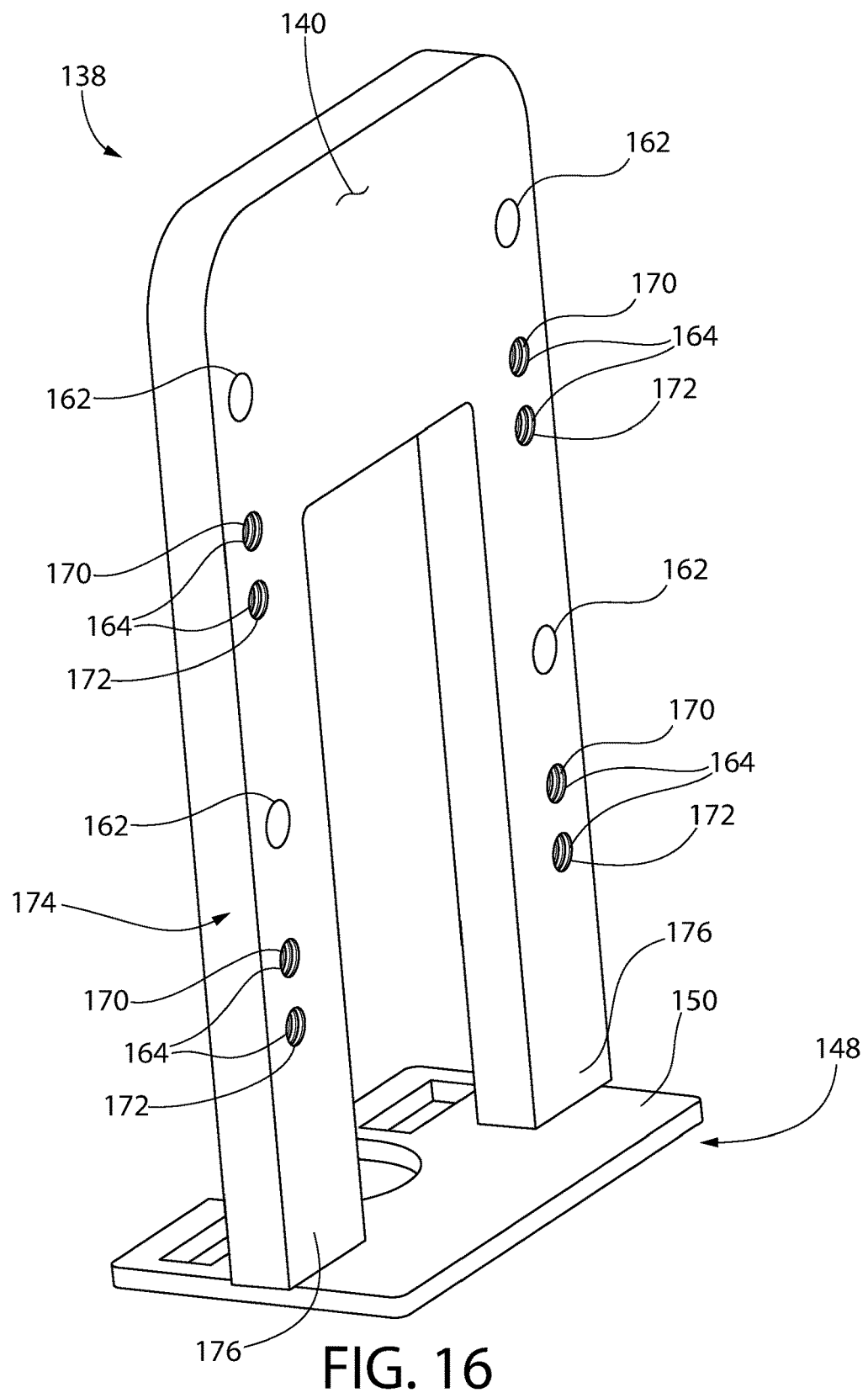
FIG. 16 is a perspective view of a fairing support member in accordance with aspects of the present disclosure.

Referring now to FIG. 12 with continuing reference to FIG. 11, the fairing adjustment member 138 includes an outer side 142 configured for mounting to the inner fairing member 24 and an inner side 140 configured for mounting to the fairing bracket 30 extending longitudinally forward from the neck portion 32 of the motorcycle frame 14. In the embodiment illustrated in FIG. 12, the outer side 142 is substantially parallel with the inner side 140. The outer side 142 is substantially parallel with the inner side 140 in that it is within 5 degrees of the inner side 140 in an embodiment, it is within 3 degrees of the inner side 140 in another embodiment, and it is within one degree of the inner side 140 in an embodiment. In additional embodiments not illustrated, the inner side 140 forms an angle with the outer side 142, including any angle between 0 and 90 degrees, such that the two sides 140, 142 are not parallel. Referring to FIG. 13, the fairing support member 60 forms part of the motorcycle 10 in an embodiment.

The fairing adjustment member 138 further includes at least one first bracket attachment point 162 and at least one fairing attachment point 164 forming an adjustment distance 166 adjusting a vertical position of the inner fairing member 24 relative to the fairing bracket 30. FIG. 11 illustrates the fairing adjustment member 138 being attached to the fairing bracket 30 at the at least one first bracket attachment point 162. The inner fairing member 24 is attached to the fairing adjustment member 138 at the at least one fairing attachment point 164. As illustrated in further detail in FIGS. 12-17, each of the at least one first bracket attachment point 162 and the at least one fairing attachment point 164 is a threaded or unthreaded hole configured to accept a screw, bolt, or other fastener therethrough. One or more of the at least one first bracket attachment point 162 and the at least one fairing attachment point 164 may include a counterbore, such as to accommodate the head of a fastener. However, in one or more embodiments not illustrated, the at least one first bracket attachment point 162 and/or the at least one fairing attachment point 164 may include any other structure or means to attach, fasten, join, or couple the fairing adjustment member 138 to the inner fairing member 24 and/or the fairing bracket 30.

In the embodiments illustrated in FIGS. 12-17, the fairing adjustment member 138 includes a main portion 174 and a lower support portion 148, as identified in FIGS. 14-17. The lower support portion 148 includes at least one support member 150 to provide vertical support for the inner fairing member 24. The at least one support member 150 includes at least one depression 152 configured to position the inner fairing member 24 relative to the fairing bracket 30. In the embodiments illustrated in FIGS. 12-17, two depressions 152 are disposed at the support member 150. The main portion 174 includes four first bracket attachment points 162 and two sets of fairing attachment points 164. Of the two sets of fairing attachment points 164, there are four upper fairing attachment points 170 and four lower fairing attachment points 172. Referring again to FIGS. 11 and 12, the fairing adjustment member 138 is attached to the fairing bracket 30 at the four first bracket attachment points 162, while the fairing adjustment member 138 is attached to the inner fairing member 24 at the fairing attachment points 164. In additional embodiments, there includes any number of first bracket attachment points 162 and/or fairing attachment points 164. In additional embodiments, any sets of the first bracket attachment points 162 are separated by any distance, any sets of the fairing attachment point 164 are separated by any distance, and any sets of the first bracket attachment points 162 and the fairing attachment points 164 are separated by any distance.

The inner fairing member 24 may be coupled to the fairing adjustment member 138 at either the four upper fairing attachment points 170 or the four lower fairing attachment points 172 depending upon the desired vertical positioning of the inner fairing member 24 and any other portion of the motorcycle fairing 22. As illustrated in FIG. 12, the four upper fairing attachment points 170 form the adjustment distance 166 when the inner fairing member 24 is coupled to the fairing adjustment member 138 at the four upper fairing attachment points 170. The four lower fairing attachment points 172 form the adjustment distance 168 when the inner fairing member 24 is coupled to the fairing adjustment member 138 at the four lower fairing attachment points 172. The adjustment distance 168 is a greater distance than the adjustment distance 166, as illustrated in FIG. 12.

Figure 17:
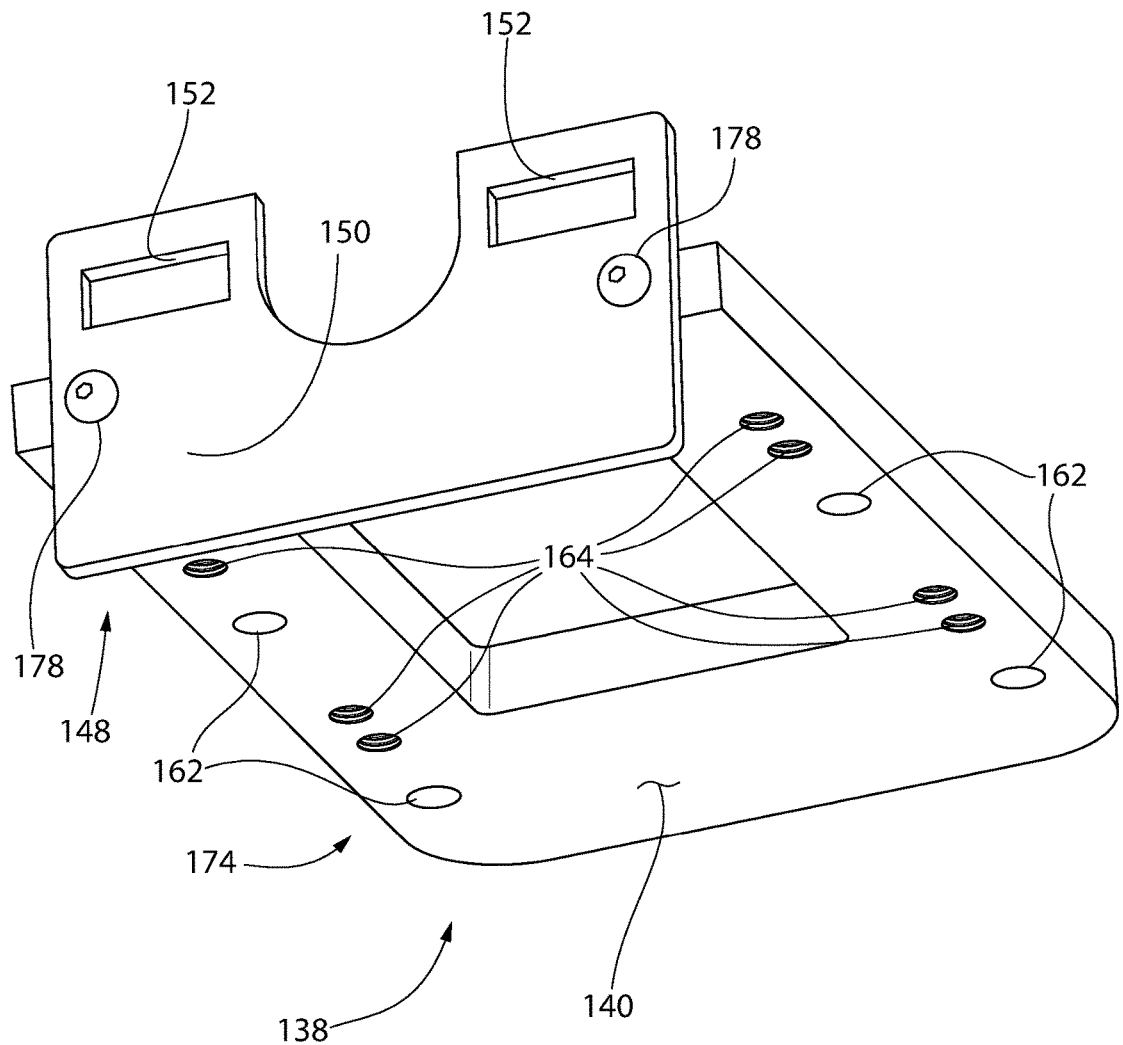
FIG. 17 is bottom perspective view of a fairing support member in accordance with aspects of the present disclosure.

When the inner fairing member 24 is coupled to the fairing adjustment member 138 at the four lower fairing attachment points 172, at least one spacer 176 is disposed between the at least one support member 150 and the main portion 174. In the embodiments illustrated in FIGS. 12-17, two spacers 176 are disposed between the support member 150 and the main portion 174. In one or more embodiments not illustrated, the at least one spacer 176 includes only a single spacer or more than two spacers, and the at least one support member 150 includes more than one support member. As best illustrated in FIG. 17, at least one fastener 178 couples the at least one support member 150 to the main portion 174 and, in the embodiments illustrated, couples the at least one spacer 176 to the at least one support member 150 and/or the main portion 174. The at least one spacer 176 cooperates with the lower fairing attachment points 172 to adjustably vertically position the inner fairing member 24 relative to the fairing bracket 30.

Where the spacer 176 does not form part of the desired application/configuration of the fairing adjustment member 138, such as where the inner fairing member 24 is coupled to the fairing adjustment member 138 at the four upper fairing attachment points 170, the at least one support member 150 is coupled directly to the main portion 174 without the at least one spacer 176 positioned therebetween. One of ordinary skill in the art will recognize that the fairing adjustment member 150 may include any configuration or number of first bracket attachment point(s) 162, fairing attachment point(s) 164, spacer(s) 176, support member(s) 150, depression(s) 152, and/or other features providing various options and/or adjustability for vertical support of the inner fairing member 24, and such configurations and variations form part of the present disclosure.

Figure 18:
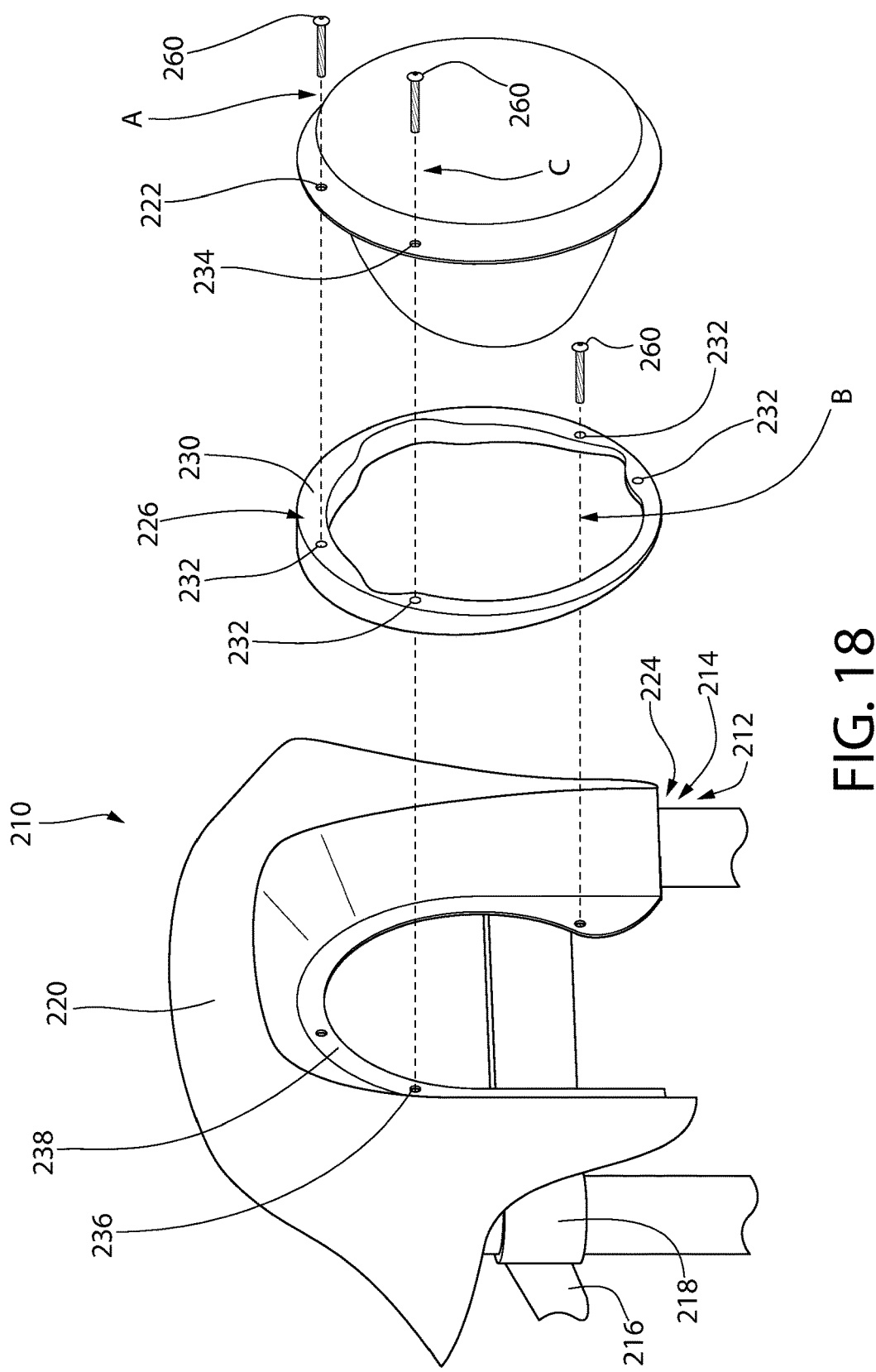
FIG. 18 is an exploded view of a component adjustment assembly in accordance with aspects of the present disclosure.
Figure 19:
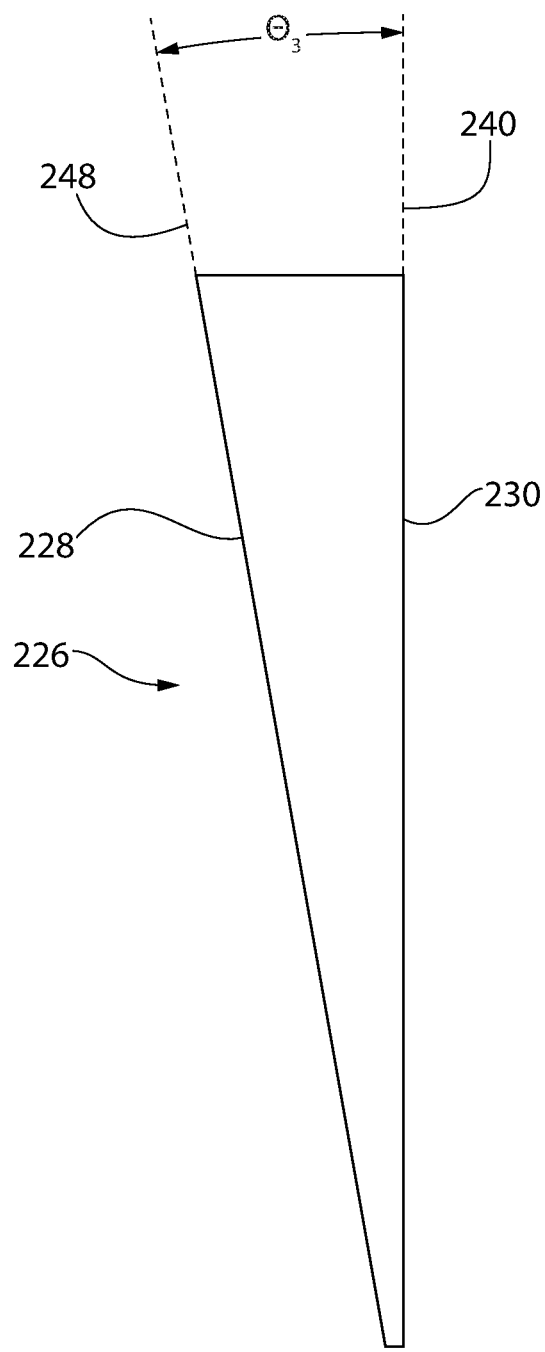
FIG. 19 is a side elevation view of a component adjustment member in accordance with aspects of the present disclosure.
Figure 20:
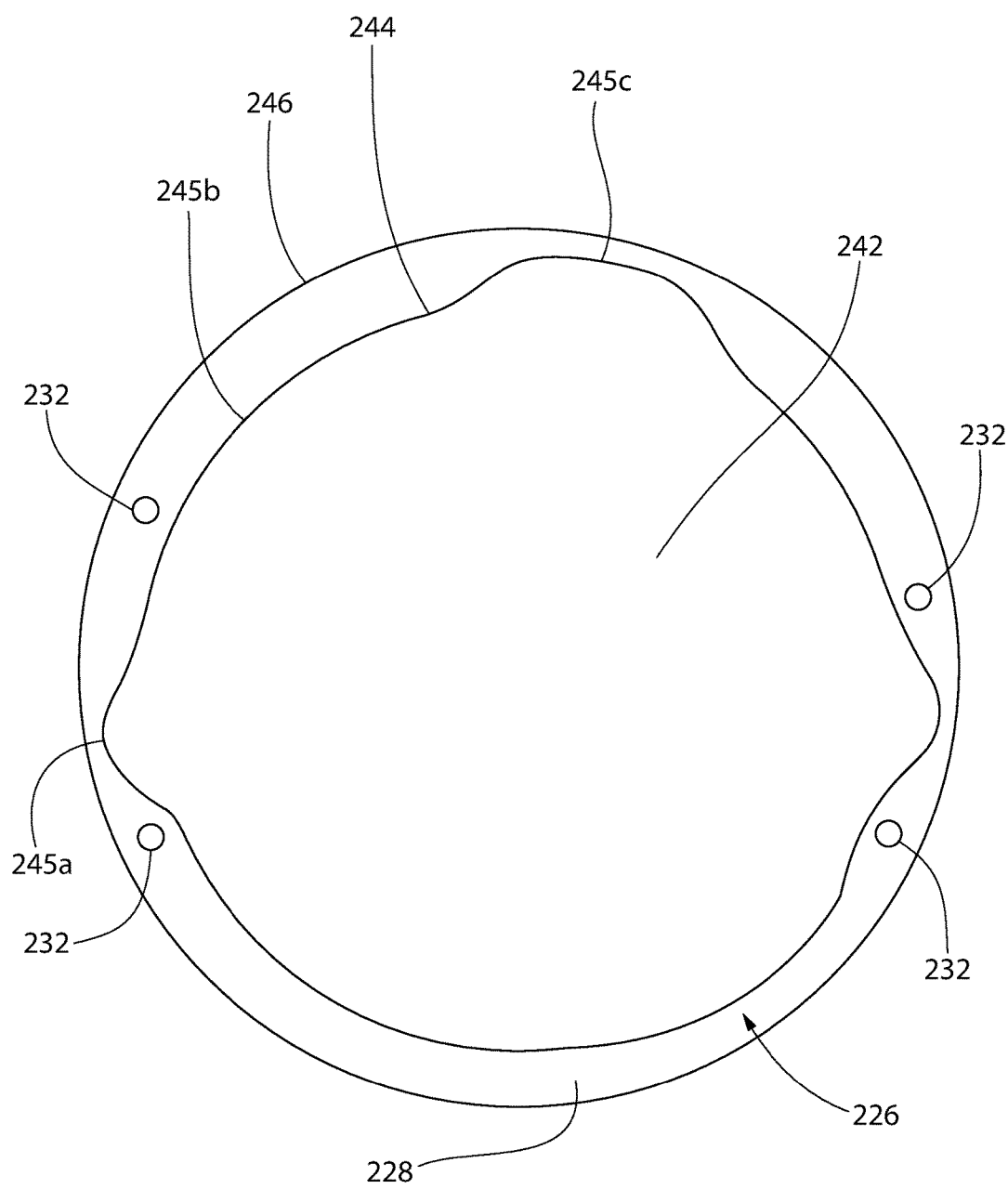
FIG. 20 is a front elevation view of a component adjustment member in accordance with aspects of the present disclosure.

Referring now to FIGS. 18-20, a motorcycle component adjustment assembly 210 in accordance with another embodiment of the present disclosure is provided. The assembly 210 includes a front fork assembly 212 disposed at a forward location 214 of a motorcycle frame 216, a fairing bracket 218 coupled to the front fork assembly 212, an optional fairing adjustment member (not shown) coupled to the front fork assembly 212 or the fairing bracket 218, a fairing member 220 coupled to the front fork assembly 212, a component, such as a headlight 222, disposed at a forward side 224 of the front fork assembly 212, and a component adjustment member 226 coupled to the fairing member 220 between the headlight 222 and the fairing member 220.

The component adjustment member 226 depicted in FIGS. 18-20 is generally circular in shape and comprised of a single, unitary, piece of material. However, those of skill in the art will appreciate that other constructions of the component adjustment member 226 may also be appropriate. For example, the component adjustment member 226 may have any shape so long as it is capable of being coupled to the fairing member 220 and the component 222, such as rectangular, triangular, or any other polygon with 3 or more sides. Additionally, suitable materials of the component adjustment member 226 include metal, dense plastic, fiberglass, and the like. In another embodiment, the component adjustment member 226 may be comprised of a "V" shaped structure, where one extension of the "V" is coupled to the fairing member 220, and the other extension of the "V" is coupled to the headlight 222, and the space between the two sides of the "V" is empty. In other words, the component adjustment member does not comprise the space between the two extensions of the "V". One of skill in the art will understand that the "V" shape is merely exemplary, and that any other shape that includes a vertex and two portions extending therefrom at an angle will also be appropriate, such as a "U" shape. Moreover, each extension of the "V-shaped" component adjustment member 226 may be the same length, or may not be the same length. In yet another embodiment, the component adjustment member 226 is comprised of tubular materials, or a plurality of flanges (for example, in the shape of a "V"). In a further embodiment, the component adjustment member 226 may be comprised of multiple pieces.

As illustrated in FIG. 19, the component adjustment member 226 includes a first side 228 having a first side plane 248 and a second side 230 having a second side plane 240. The first side plane 248 and second side plane 240 forming an adjustment angle $\theta_3$ that, for example, adjusts an angle of the headlight 222 relative to the fairing member 220. In one embodiment, adjustment angle $\theta_3$ ranges from approximately 1 degree to approximately 25 degrees. In another embodiment, adjustment angle $\theta_3$ ranges from approximately 3 degrees to approximately 15 degrees. In yet another embodiment, adjustment angle $\theta_3$ is between 6 and 7 degrees. The second side 230 of the component adjustment member 226 is disposed against the headlight 222. The first side 228 of the component adjustment member 226 is disposed against a fairing member outer surface 238. In an embodiment, the component adjustment assembly 210 is comprised of a plurality of component adjustment members 226, where the plurality of component adjustment members 226 have various adjustment angles $\theta_3$, allowing a user to selectively choose which angled component adjustment members 226 to install to achieve a desired combined adjustment angle. For example, if a set of component adjustment members 226 includes five component adjustment members 226 with adjustment angles $\theta_3$ of 1, 2, 3, 4, and 5 degrees, a user could create a 7 degree combined adjustment angle by installing the 5 degree and 2 degree component adjustment members 226 together. One of skill in the art will understand that in this type of embodiment, the plurality of component adjustment members 226 are structured such that they may be easily combined, for example, by having a first side 228 and a second side 230 that are relatively flat and smooth, as the embodiment in FIGS. 18-20 depicts.

As best depicted in FIG. 20, in the embodiment where the component adjustment member 226 is generally circular in shape, the outer perimeter 246 of the component adjustment member 226 defines the generally circular shape, and the space between the first side 228 and the second side 230 is filled with the material with which the component adjustment member 226 is made. In the embodiment depicted in FIG. 20, the component adjustment member 226 includes an aperture 242 formed through a central portion of the component adjustment member 226. The aperture 242 allows electrical wiring and/or protruding portions of the component 222, e.g. a headlight, to pass and/or extend therethrough. The aperture 242 forms an inner perimeter 244 of the component adjustment member 226. In one embodiment, the inner perimeter 244 is sized and shaped to receive the component 222. For example, the inner perimeter 244 is sized and shaped to be substantially flush with a portion of the headlight such that the component adjustment member 226 can be slipped onto the headlight much like a ring on a finger. For example, the inner perimeter 244 may be generally circular in shape and include at least one contour $245_{a-c}$, such that the contours $245_{a-c}$ of the inner perimeter 244 substantially coincide with a portion of the headlight with which the inner perimeter 244 comes in contact. Among other advantages, by matching enough of the at least one contours 245$_{a-c}$ of the inner perimeter 244 to similar contours of the headlight, the headlight will be prevented from rotating or otherwise moving when received by the component adjustment member 226. Similarly, the outer perimeter 246 may be sized and shaped to be received by the fairing member 220 such that the component adjustment member 226 fits snugly into the receiving portion of the fairing member 220. One of skill in the art will understand that the concepts described in this paragraph with respect to the inner perimeter 244, outer perimeter, 246, and aperture 242 apply equally to any shape or structure of component adjustment member 226 described herein.

As illustrated in FIGS. 18 and 20, the fairing member 220 includes at least one fairing attachment point 236, the component adjustment member 226 includes at least one adjustment member attachment point 232, and the headlight 222 includes at least one headlight attachment point 234. The at least one headlight attachment point 234 and the adjustment member attachment point 232 are configured for attachment of the headlight 222 to the component adjustment member 226, for example, by the use of a fastener 260. The at least one adjustment member attachment point 232 and the fairing attachment point 236 are configured for attachment of the component adjustment member 226 to the fairing member 220, for example, by the use of a fastener 260.

In an embodiment depicted by line A in FIG. 18, a fastener 260 affixes the headlight 222 to the component adjustment member 226 by coupling the headlight attachment point 234 and the adjustment member attachment point 232. In another embodiment depicted by line B in FIG. 18, a fastener 260 affixes the component adjustment member 226 to the fairing member 220 by coupling the adjustment member attachment point 232 and the fairing attachment point 236. In yet another embodiment, the fastener 260 used to attach the component adjustment member 226 to the fairing member 220 does not also attach the headlight 222 to the component adjustment member 226. In a similar embodiment, the fastener 260 used to attach the headlight 222 to the component adjustment member 226 does not also attach the headlight 222 to the fairing member 220. In other words, the headlight 222 and fairing member 220 are each individually attachable to the component adjustment member 226. In an alternative embodiment depicted by line C in FIG. 18, the same fastener 260 is used to attach the headlight 222 to the component adjustment member 226 to the fairing member 220 by coupling the headlight attachment point 234, the adjustment member attachment point 232, and the fairing attachment point 236. The fastener 260 may be any type of suitable fastener known in the art, including, but not limited to, a nut and bolt, and may also include threading that engages corresponding threading included in any of the fairing attachment point 236, adjustment member attachment point 232, and headlight attachment point 234. Alternatively, the fastener may extend through the fairing attachment point 236, adjustment member attachment point 232, and/or headlight attachment point 234 and engage corresponding threading included in the fairing member 220.

In another embodiment of the component adjustment assembly 210, a separate component adjustment member 226 may be utilized for each fastener 260. In this embodiment, the aperture 242 is sized and shaped to receive the fastener 260 such that a separate component adjustment member 226 is necessary for each fastener 260 where adjustment is required. In one version of this embodiment, the inner perimeter 244 formed by the aperture 242 is roughly the same size as the fastener 260. For example, for a component 222 that requires four fasteners 260, with two being on at a top portion and two being at a bottom portion, two component adjustment members 226 according to this embodiment would be utilized on the top two fasteners 260 to adjust the angle of the component 222. However, a person of skill in the art will understand that component adjustment members 226 could be used at one, two, three, or all four of the four fastener 260 system. One advantage of this embodiment is that each component adjustment member 226 is not limited to a specific make and model of motorcycle, because the component adjustment members 226 merely need to be capably of fitting onto the fasteners 226, rather than having to both fit onto a fairing member 220 and line up with the fairing member attachment points. One of skill in the art will understand that the component adjustment members 226 of this embodiment may be sized and shaped in any manner acceptable to fit onto the various fasteners 226 to affix various components 222 to various motorcycle makes and models.

In one or more additional embodiments, the component adjustment assembly 210 includes, and the component adjustment member 226 is configured to adjust, other motorcycle components, including, without limitation, a turn signal or other lamp other than a headlight, gauge(s), mirror, fairing, handlebar, and/or any one or more other components of a motorcycle or other vehicle.

The present disclosure further provides a method of adjusting the motorcycle fairing 22 and/or the inner fairing member 24. In one embodiment, the method includes removing the inner fairing member 24 from the fairing bracket 30. The method includes coupling the fairing adjustment member 138 to the fairing bracket 30 at the at least one first bracket attachment point 162 and coupling the inner fairing member 24 to the fairing adjustment member 138 at the at least one fairing attachment point 164 such that the adjustment distance 166/168 is formed by the at least one first bracket attachment point 162 and the at least one fairing attachment point 164 corresponding to a vertical adjustment of the inner fairing member 24 relative to the fairing bracket 30.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

I claim:

1. A motorcycle component adjustment assembly comprising:
a front fork assembly disposed at a forward location of a motorcycle frame;
a fairing member;
a component capable of coupling to the fairing member, wherein the component is a headlight;
a component adjustment member capable of coupling to the fairing member between the component and the fairing member and comprising a first side and a second side forming an adjustment angle that adjusts the angle of the component relative to the fairing member.

2. The assembly of claim 1, wherein the second side of the component adjustment member is to be coupled to the component.

3. The assembly of claim 1, wherein the component is to be coupled to the component adjustment member using an at least one fastener and the at least one fastener does not also couple the component adjustment member to the fairing member.

4. The assembly of claim 1, wherein the headlight is to be coupled to the component adjustment member using an at least one fastener and the at least one fastener also couples the component adjustment member to the fairing member.

5. The assembly of claim 1, wherein the first side of the component adjustment member is capable of coupling to a fairing member outer surface.

6. The assembly of claim 5, wherein the component adjustment member is capable of coupling to the fairing member using an at least one fastener and the at least one fastener does not also couple the component to the component adjustment member.

7. The assembly of claim 1, wherein the adjustment angle ranges from 1 degree to 25 degrees.

8. The assembly of claim 7, wherein the adjustment angle ranges from approximately 3 degrees to approximately 15 degrees.

9. The assembly of claim 8, wherein the adjustment angle ranges from approximately 6 degrees to approximately 7 degrees.

10. The assembly of claim 1, wherein the component adjustment member is generally circular in shape.

11. The assembly of claim 10, wherein the component adjustment member is a single, unitary piece.

12. The assembly of claim 1, wherein the component adjustment member is made of a plastic or aluminum material.

13. A method of adjusting a motorcycle component comprising:
    providing a front fork assembly disposed at a forward location of a motorcycle frame;
    providing a fairing member to be coupled to the front fork assembly;
    providing a component, wherein the component is a headlight;
    providing a component adjustment member comprising a first side and a second side forming an adjustment angle;
    coupling the first side of the component adjustment member to the fairing member;
    coupling the component to the second side of the component adjustment member;
    wherein the adjustment angle adjusts the angle of the component relative to the fairing member.

14. The method of claim 13, wherein the adjustment angle ranges from 1 degree to 25 degrees.

15. The assembly of claim 14, wherein the adjustment angle ranges from approximately 3 degrees to approximately 15 degrees.

16. The assembly of claim 15, wherein the adjustment angle ranges from approximately 6 to approximately 7 degrees.

17. A component adjustment member comprising:
    a first side and a second side disposed such that an adjustment angle is formed therebetween;
    an aperture defining an inner perimeter having an at least one contour and an outer perimeter;
    wherein the outer perimeter is generally circular in shape;
    wherein the adjustment angle ranges from approximately 3 degrees to approximately 15 degrees;
    wherein the first side is capable of being coupled to motorcycle fairing member and the second side is capable of being coupled to a motorcycle headlight such that the angle of the headlight relative to the fairing member is adjusted by the adjustment angle;
    wherein the at least one contour is sized and shaped such that it is capable of receiving the headlight.

* * * * *